United States Patent
Koolhaas et al.

(10) Patent No.: US 9,517,853 B2
(45) Date of Patent: Dec. 13, 2016

(54) APPARATUS FOR HEAT SHRINKING A FILM WRAPPING AN OBJECT AND METHOD FOR OPERATING THE APPARATUS

(75) Inventors: Ernst Christiaan Koolhaas, Nuenen (NL); Martinus Hubertus Maria Van Der Linden, Veghel (NL)

(73) Assignee: FUJI SEAL INTERNATIONAL, INC., Osaka (JP)

( * ) Notice: Subject to any disclaimer, the term of this patent is extended or adjusted under 35 U.S.C. 154(b) by 527 days.

(21) Appl. No.: 14/113,079

(22) PCT Filed: May 10, 2012

(86) PCT No.: PCT/NL2012/050317
§ 371 (c)(1),
(2), (4) Date: Oct. 21, 2013

(87) PCT Pub. No.: WO2012/154048
PCT Pub. Date: Nov. 15, 2012

(65) Prior Publication Data
US 2014/0053515 A1    Feb. 27, 2014

(30) Foreign Application Priority Data
May 10, 2011  (NL) .................................. 2006753

(51) Int. Cl.
*B65B 53/00*    (2006.01)
*B65B 53/06*    (2006.01)
(Continued)

(52) U.S. Cl.
CPC ............. *B65B 53/06* (2013.01); *B29C 63/423* (2013.01); *B65B 21/245* (2013.01);
(Continued)

(58) Field of Classification Search
CPC .......... B65B 53/00; B65B 53/02; B65B 53/06; B65B 53/063
(Continued)

(56) References Cited

U.S. PATENT DOCUMENTS 3,678,244 A * 7/1972 Worline ................ B65B 53/063
219/388
3,744,146 A * 7/1973 Nichols ................. B65B 53/063
34/212
(Continued)

FOREIGN PATENT DOCUMENTS

EP    2 103 527 A1    9/2009
FR    2 588 828 A1    4/1987

OTHER PUBLICATIONS

U.S. Appl. No. 14/113,041, filed Oct. 21, 2013 in the name of Koolhaas et al.
(Continued)

*Primary Examiner* — Andrew M Tecco
*Assistant Examiner* — Chelsea Stinson
(74) *Attorney, Agent, or Firm* — Oliff PLC

(57) ABSTRACT

The invention relates to an apparatus for heat shrinking a film wrapping an object and a method for operating such an apparatus. The apparatus includes a heat treatment chamber and a transport device for supporting and moving the object through the heat treatment chamber. Steam is supplied to a fluid outlet device including one or more nozzles. The apparatus further includes a window arranged to allow an operator to look inside the heat treatment chamber. To improve continuous viewing capabilities the apparatus further includes a blurring reduction system. A fluid flow is generated along an inner side of the window.

11 Claims, 4 Drawing Sheets

(51) Int. Cl.
*B29C 63/42* (2006.01)
*B65B 21/24* (2006.01)
*B29L 31/00* (2006.01)

(52) U.S. Cl.
CPC ..... *B65B 53/063* (2013.01); *B29L 2031/7158* (2013.01); *B29L 2031/744* (2013.01)

(58) Field of Classification Search
USPC .................................. 53/442; 426/106, 115
See application file for complete search history.

(56) References Cited

U.S. PATENT DOCUMENTS

| | | | |
|---|---|---|---|
| 4,579,614 A | 4/1986 | Burmeister et al. | |
| 5,031,298 A | 7/1991 | Fresnel | |
| 5,475,969 A * | 12/1995 | Sowden | B29C 61/02 414/147 |
| 7,169,420 B2 * | 1/2007 | Korengel | A23L 2/46 426/115 |
| 7,415,428 B2 * | 8/2008 | Garwood | A23B 4/16 426/392 |
| 7,784,248 B2 * | 8/2010 | Andersson | B65B 55/12 426/401 |
| 8,903,540 B2 * | 12/2014 | Stork | G05B 19/00 700/213 |
| 2003/0044744 A1 * | 3/2003 | Nava | B65B 53/063 432/121 |
| 2004/0123566 A1 * | 7/2004 | Limousin | B65G 21/14 53/442 |
| 2008/0115322 A1 * | 5/2008 | Migli | E05D 15/46 16/283 |
| 2009/0188605 A1 * | 7/2009 | Huang | B29C 61/00 156/84 |
| 2010/0032077 A1 * | 2/2010 | Uetsuki | B65B 53/063 156/86 |
| 2013/0284346 A1 * | 10/2013 | Koolhaas | B65C 3/065 156/85 |

OTHER PUBLICATIONS

International Search Report issued in PCT Application No. PCT/NL2012/050317 on Aug. 6, 2012.
Written Opinion of the International Searching Authority issued in PCT Application No. PCT/NL2012/050317 on Aug. 6, 2012.
International Preliminary Report on Patentability issued in PCT Application No. PCT/NL2012/050317 on May 13, 2013.
International Search Report issued in PCT Application No. PCT/NL2012/050316 on Aug. 2, 2012.
Written Opinion of the International Searching Authority issued in PCT Application No. PCT/NL2012/050316 on Aug. 2, 2012.
International Preliminary Report on Patentability issued in PCT Application No. PCT/NL2012/050316 issued on May 13, 2013.

* cited by examiner

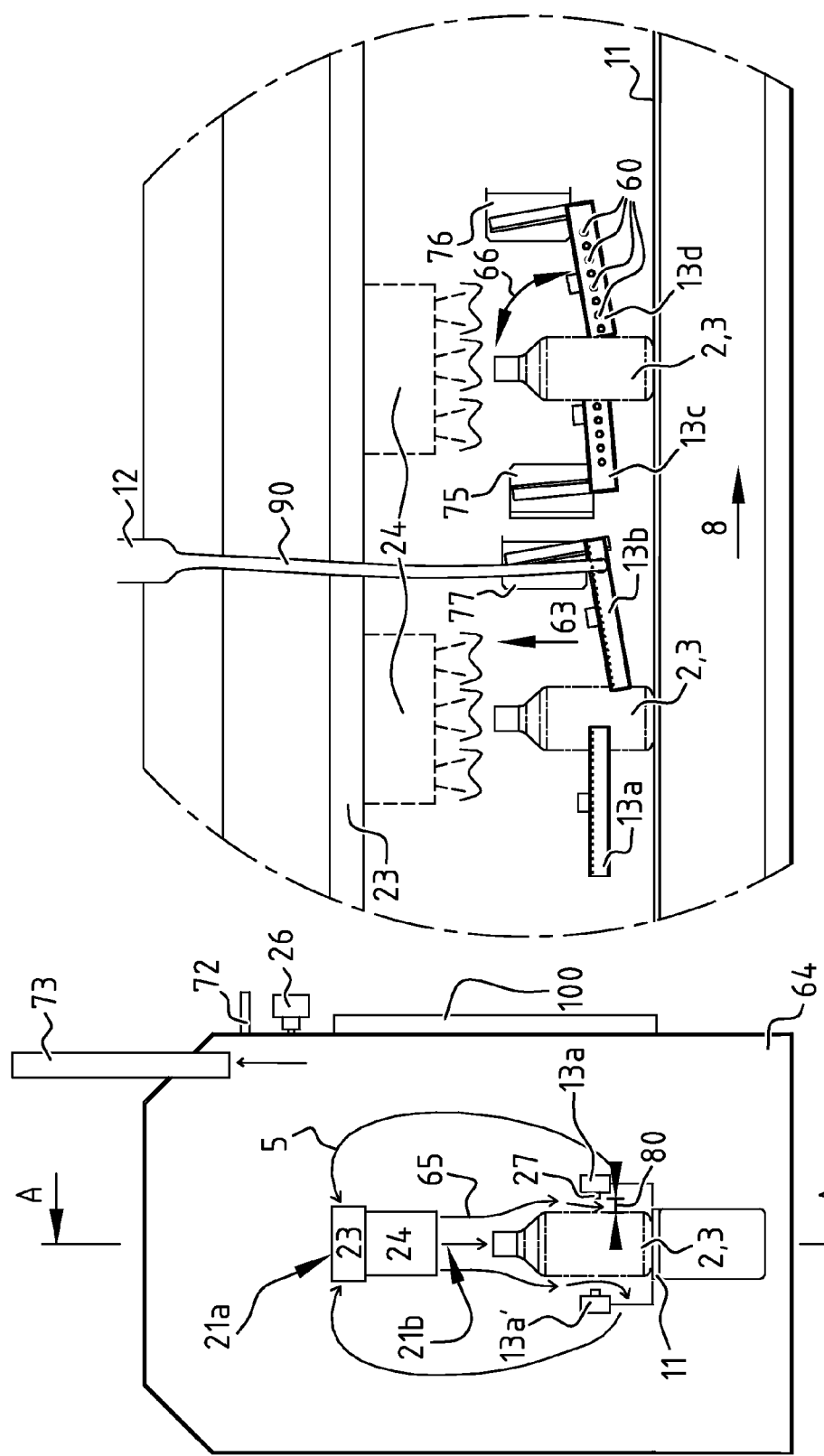

APPARATUS FOR HEAT SHRINKING A FILM WRAPPING AN OBJECT AND METHOD FOR OPERATING THE APPARATUS

The invention relates to an apparatus for heat shrinking a film wrapping an object. The invention also relates to a method for operating such an apparatus.

US 2009/0188605A1 discloses an apparatus for heat shrinking a film wrapping an object. The apparatus has windows for allowing the operator to watch the objects inside the heat treatment chamber while being treated. This in turn allows improving the configuration of the apparatus.

The steam has a temperature in the heat treatment chamber higher than outside. The view through the window can be hindered due to blurring of the window.

It is a goal of the invention to improve the viewing capabilities during operation of the apparatus and to improve the known method.

According to an aspect of the invention an apparatus for heat shrinking a film wrapping an object is provided, the apparatus comprising a housing having a heat treatment chamber. The apparatus further has a window arranged to allow an operator to look inside the heat treatment chamber. In an embodiment a transport device for supporting and moving the object through the heat treatment chamber is provided. The transport device allows conveying the object and film through the heat treatment chamber. In an embodiment a least one supply for steam is provided connected to at least a fluid outlet device comprising one or more outlets for the steam. The fluid outlet device is disposed in the heat treatment chamber along the transport device. When the film wrapping the object is transported, it will pass along the fluid outlet device. The one or more outlets are directed towards the moving object.

In an embodiment the apparatus further comprises a blurring reduction system for reducing blurring of the window, the system arranged to generate a fluid flow along an inner side of the window. The system comprises a device for generating a fluid flow and the fluid flow is directed at and along the inner side of the window. The fluid flow generator can induce a flow of steam, fluid, air. This will reduce blurring of the inner side of the window. The method will allow a more efficient operation because the operator can continue to watch the process of heat shrinking inside the oven.

It was found that the solution according to the invention also increases the safety of the apparatus as the generated fluid flow results in a cooling of the window.

It is noted that an oven having a window is known from US 2004/0123566. US 2004/0123566 discloses heat shrinking labels in an oven using a conveyor for transporting objects. Heated air is supplied from above and under towards the objects. The heated air is propelled using fans. The housing has a window to allow an operator to watch the wrapping process. As heated air is used, condensation is not an issue. Heated air doesn't block visual inspection.

In an embodiment the blurring reduction system comprises a nozzle or a slit for directing the fluid flow onto the inside of the window.

In an embodiment the blurring reduction system comprises a fluid inlet for the intake of outside air, including air present at the operation location. Outside air will be cooler air than the fluid/air in the heat treatment chamber. Further the vapour content of outside air is low.

In an embodiment the apparatus comprises a human interface or configuration device for allowing (re-)configuration of the steam supply. The configuration device allows adjustment e.g. of the amount of fluid supplied. In an embodiment the configuration device can be mechanically connected to the fluid outlet device to allow repositioning thereof. By repositioning e.g. the distance between the moving object and a nozzle or outlet from the fluid outlet device can be varied resulting in a different configuration of the heat shrinking of the film. In combination with the window changes in configuration can be made without the need of the operator accessing the heat treatment chamber in combination with stopping the apparatus. This results in a more efficient operation, reducing down time.

In an embodiment the configuration device comprises turning knobs provided on an outside of the housing adjacent the window. The operator will be able to watch through the window the effect of his change in the configuration upon the shrinking of the film of the moving object. This will increase the efficiency of operation.

In an embodiment the blurring reduction system comprises a secondary chamber arranged in between the window and the heat treatment chamber, the secondary chamber connected to the heat treatment chamber by a passage. The system according to this embodiment comprises a chamber separate from the heat treatment chamber but directly (open) connected to it via a passage. Viewing through the window into the heat treatment chamber remains possible. However the secondary chamber will have e.g. a temperature lower, in an embodiment significantly lower, than the operating temperature in the heat treatment chamber. This will reduce blurring. The supplied fluid into the secondary chamber will have a lower temperature. The supplied fluid will remain in the secondary chamber and forms a heat curtain between the heat treatment chamber and the window.

In an embodiment the blurring reduction system can form an integral part of a system for generating fluid flows in the heat treatment chamber. In an embodiment the fluid flow in e.g. the secondary chamber is guided in such a way first along the window but also directed into the heat treatment chamber such that a pattern of fluid flow in the heat treatment chamber is not disturbed.

In an embodiment the temperature of the fluid flow pattern in the heat treatment chamber is at least 4, preferably 12, degrees Celsius lower than the steam flow entering the heat treatment chamber through the outlets. In an embodiment the temperature of the fluid flow pattern in the heat treatment chamber is less than 88 degrees Celsius, preferably less than 85 degrees Celsius and more preferably less than 82 degrees Celsius. Heat shrink ratios of well known films at these temperatures are low, resulting in a primary shrink only as a result of applied (primary) heat, making the process more controllable. The lowering of the temperature is partially the result of cooler fluid being available from the window/secondary chamber. In this way the window blurring reduction system aids the fluid flow generating system in the heat treatment chamber.

In an embodiment the window is arranged in a side of the housing along the transport device. This allows viewing the object moving in the transport direction. Multiple windows can be provided along this housing side allowing viewing the object along its complete path through the apparatus/heat treatment chamber.

In an embodiment the housing comprises a door, the door having the window. Such an embodiment allows the combination of providing the window at a 'normal' working height for the operator such that he can view inside the heat treatment chamber just by walking by the window, when the door is closed. When the door is open, the window is also repositioned, allowing the operator to access the heat treatment chamber at a normal working height.

In embodiment the door is a generally vertically positioned door connected to the housing by a parallelogram linkage mechanism. This will allow opening the door, while the door maintains is generally vertical position.

In an embodiment the door comprises a gutter for collecting fluid. The gutter is positioned on an inside of the door. When the door is opened fluid or vapour on the inside of the door is collected in the gutter.

In an embodiment the fluid flow generator is mounted to the door. The fluid flow generator is then positioned outside the heat treatment chamber. This reduces the chance of failure of the generator due to vapour presence.

In an embodiment the door is a double walled door and the fluid flow device is disposed between the double walls of the door.

In an embodiment the door comprises the secondary chamber.

According to a further aspect of the invention a method of operating an apparatus for shrinking a heat shrinkable film wrapping an object is provided. The method can comprise transporting the upright standing object wrapped with heat shrinkable film through a heat treatment chamber. Further the method can comprise applying steam onto a side of the film. The method is performed in a heat treatment chamber of the apparatus, the apparatus having a window for viewing inside the heat treatment chamber.

In an embodiment the method further comprises applying a fluid onto a side of the window. The fluid applied and directed onto a side of the window will reduce the blurring on the window during operation of the apparatus. The operator will be allowed to continuously follow the heat shrinking of the film in the heat treatment chamber.

In an embodiment the fluid applied to an inside of the window is of lower temperature than the steam. This will result in cooling of the window. This increases safety.

In an embodiment applying the fluid onto the window comprises venting the fluid through a slit directed at an inside of the window. This is an efficient way of directing the fluid flow.

In an embodiment the method further comprises configuring the supplied steam by an operator. Preferably the operator can adjust a configuration of supplied fluid, e.g. the amount of supplied fluid or the temperature of the supplied fluid, but can also include adaptation of the direction of application. Configuring the supplied fluid can be done by the operator while looking inside the apparatus, viewing the moving objects wrapped with film, the apparatus being in operation/in use. This will reduce the downtime of the apparatus. Further the operator will be able to get direct feedback of the results of his/her (re-)configuration of the supplied steam.

In an embodiment a secondary chamber is provided in the apparatus, the secondary chamber positioned between the window and the heat treatment chamber. The window forms a side of the secondary chamber. The secondary chamber and the heat treatment chamber are connected by a passage. In this embodiment the fluid to the window is supplied into the secondary chamber and forms a fluid curtain between the fluid in the heat treatment chamber. In an embodiment the window, passage and steam outlet device are aligned to allow an operator to view the steam outlet device in the heat treatment chamber through the window. The passage allows viewing but limits the amount of heat exchange and entry of steam into the secondary chamber.

In an embodiment the fluid supplied to the window, in particular the fluid supplied to the secondary chamber, is guided into the heat treatment chamber such that it combines with a fluid flow pattern present or generated in the heat treatment chamber. Guiding the fluid flow can comprise a channel for directing the fluid flow.

Although in not limiting the scope of protection and showing embodiments only, these and other objects of the invention will now be described in more detail referring to the accompanying drawings, in which:

FIG. 2 shows a cross sectional view of the apparatus according to FIG. 1;

FIG. 3 shows a cross sectional view along A-A in FIG. 2;

For better understanding of the invention, similar parts will have the same reference numbers in the following description of the figures.

Figure 1:
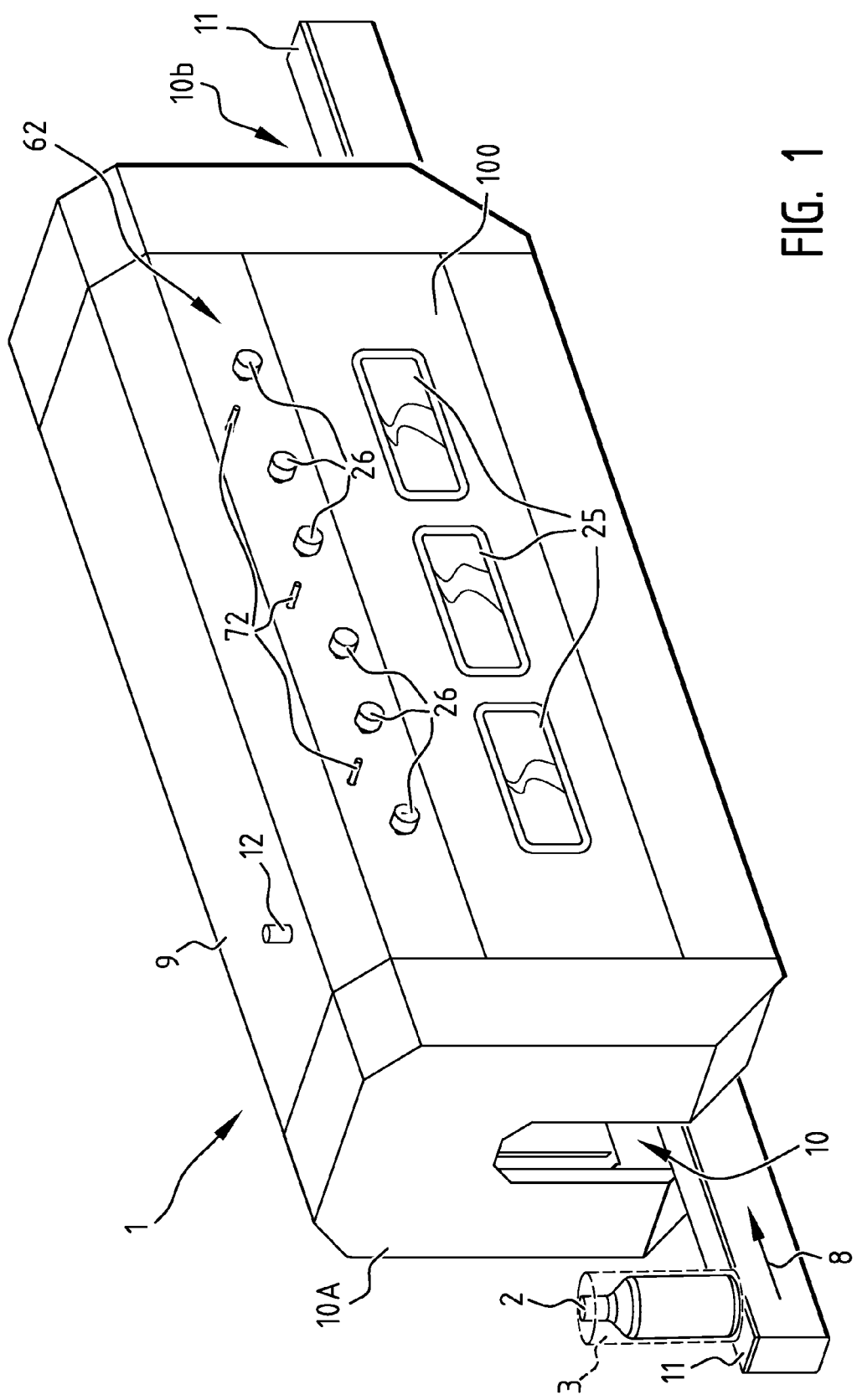
FIG. 1 shows a first view of an apparatus according to the invention.

Apparatus 1, as schematically illustrated in FIG. 1, is an apparatus for heat shrinking a heat shrink film 3 wrapping an object 2.

The heat shrinking film 3 is made from shrinkable material that will shrink at a certain minimum temperature that can be reached by applying steam such as steam. Shrinking of the film will result in closely wrapping the shape of the object formed by a bottle or package. Reference is made to EP 2 103 527 A1 by the same applicant, included by reference.

An apparatus 1 for heat shrinking, such as a heat shrink oven, is known as such from prior art and has a housing 9. The illustrated housing is of generally rectangular shape. Top sides along the length of the housing are bevelled.

The housing 9 has heat treatment chamber 64. Inside the heat treatment chamber a tunnel-shaped space 10 is formed, having an entry side 10*a* and an exit side 10B. The apparatus comprises transport device 11. The transport device 11 extends through the heat treatment chamber 64. The transport device can carry an object 2 with film 3 through the tunnel-shaped space 10.

The housing 9 is provided with windows 25 allowing the operator to look inside the heat treatment chamber inside the housing 9. Several windows 25 allow the operator to watch several steps (upstream near 10*a* or downstream near 10*b*) of the process.

On the outside of housing 9 a human interface 62 from a configuration device and is provided to allow the operator to control the heat treatment process in the heat treatment chamber. Specifically the operator is able to adjust or reconfigure parameters of the supplied steam.

In this embodiment the human interface 62 comprises multiple knobs 26. Each knob 26 can be used to control one or more parameters of the heat shrinking process. The interface 62 can also comprise shafts 72 connected to a control valve for controlling the supply of steam. In an embodiment the pressure of the steam is controlled allowing control of the temperature. As will be discussed hereunder the configuration device can also adapt the distance 80.

In order to shrink the film 3 wrapping the object 2 using heat, the apparatus comprises a supply 12 for heated fluid. The heated fluid can be steam. In this embodiment the steam is supplied from an external source. In another embodiment the steam is heated in the apparatus.

The supply 12 will allow the steam to be supplied to the heat treatment area 64 and in particular to the tunnel shaped area 10 receiving the object. The supply 12 can comprise a system of tubes for transporting the steam, for clarity sakes not visible in the figures.

Multiple fluid outlet devices 13a-13a' . . . , 13d-13d' are connected to supply 12 (in FIG. 3 only one connection 90 is shown) and disposed on either sides along transport device 11. Fluid outlet device 13a is disposed on the right-hand of the transport device 11. The fluid outlet device 13a' is positioned on the left-hand side. The tunnel-shaped area 10 is partially positioned in between the fluid outlet devices 13a-13a'.

In the embodiment shown, every fluid outlet device 13a-13a'; . . . ; 13d-13d' comprises multiple outlets 27, 60 arranged in line. Outlets 27, shown in FIG. 2, are arranged for releasing the (primary) steam. This fluid is at such operational temperature and has heat to shrink film when the fluid comes into contact with film.

The outlets 27 are directed at objects supported and conveyed by the transport device 11 through the tunnel-shaped area 10.

A detailed view of fluid outlet devices 13a-13a' and outlet 60 is shown in FIG. 3. The outlets 60 are disposed on the body 61. The outlets 27, 60 with body 61 form the fluid outlet device 13a-13a'; . . . ;13d-13d'. The outlets 27 are connected to supply 12 for steam. The fluid outlet devices 13a-13a' etc. comprise a manifold for distributing the supplied steam to the different outlets 27, 60.

Several fluid outlet devices 13a-13d are disposed along the length 8 of the transport device 11 at different locations. An object 2 supported and carried by the transport device 11 will pass along the subsequent fluid outlet devices 13a-13d' when moved in the transport direction 8.

An object 2 wrapped with film 3 is transported from the inlet side 10a to the outlet side 10b and fluid outlet device 13a is positioned more upstream than fluid outlet device 13d.

The fluid outlet devices 13a-13d' can be positioned at different heights (indicated by arrow 63) or angles (indicated by arrow 66) along the transport device 11 in order to, when an object 2 and films 3 wrapping the object are transported in the transport direction, supply the steam onto the objects 2/films 3 moving through the tunnel-shaped area 10 at different locations.

The different positions of the fluid outlet devices allow obtaining a shrinking effect of the complete film 3 around object 2 with certain control in order for the film to closely wrap the shape of the object 2. The positioning and configuration of the fluid outlet devices along the transport device 11 allows control of circumstances of shrinking. Good control reduces failure in wrapping the object and will improve efficiency of the apparatus as a whole. Further the size of the nozzle of the outlets can be varied.

In order to control the circumstances of shrinking in the tunnel-shaped area 10 even more, in accordance with the invention, the heat treatment chamber 64 comprises a system for generating a downward directed fluid flow 65 in the tunnel-shaped area, between to two fluid outlet devices 13a-13a' disposed opposite on another along the transport device 11.

The primary steam flow from the outlets 27 is directed at the moving objects 3 and the steam will perform its shrinking function by subsequently losing some of its heat. The system according to the invention will subsequently direct the "used" steam away from the object and away from the transport device. The system will direct secondary steam away in a downward direction.

The system in accordance to the invention provides an additional flow pattern 5 on top of the steam released from the fluid outlet device 13a-13d'. The system in accordance to this embodiment will allow a circulation of secondary steam in a pattern indicated with arrow 5 in FIG. 2.

During circulation, but already due to the fact that the steam is directed at the film, the temperature of the fluid is lower than the steam released from the outlets 27. During circulation no heat is added and therefore the temperature of fluid will be reduced further. As it reaches the inlet side 21a of the vent 24 the fluid will have a significant lower temperature than the fluid supplied to the heat treatment chamber, e.g. at least 2 degrees, but preferably 5 or more degrees less. In an embodiment the fluid temperature is lower than 90 degrees when it is directed downward by the fan 24 and forms the downward directed fluid flow between the fluid outlet devices 13a-13d.

FIG. 2 shows an exhaust 73 allowing the release of fluid present in the heat treatment chamber 64. Exhaust 73 is arranged in the area outside the fluid outlet devices 13a-13a'. In this area the flow pattern has an upward direction. The outlet/exhaust is positioned to allow the pattern to flow into the outlet, not disturbing the fluid pattern.

Fans 24 are connected to a carrier 23 part of the frame of the housing 9.

The distance 80 between the outlets 27 of fluid outlet devices 27 can be varied. In the system of the invention the distance 80 is preferably less than 8 cm.

Figure 4:
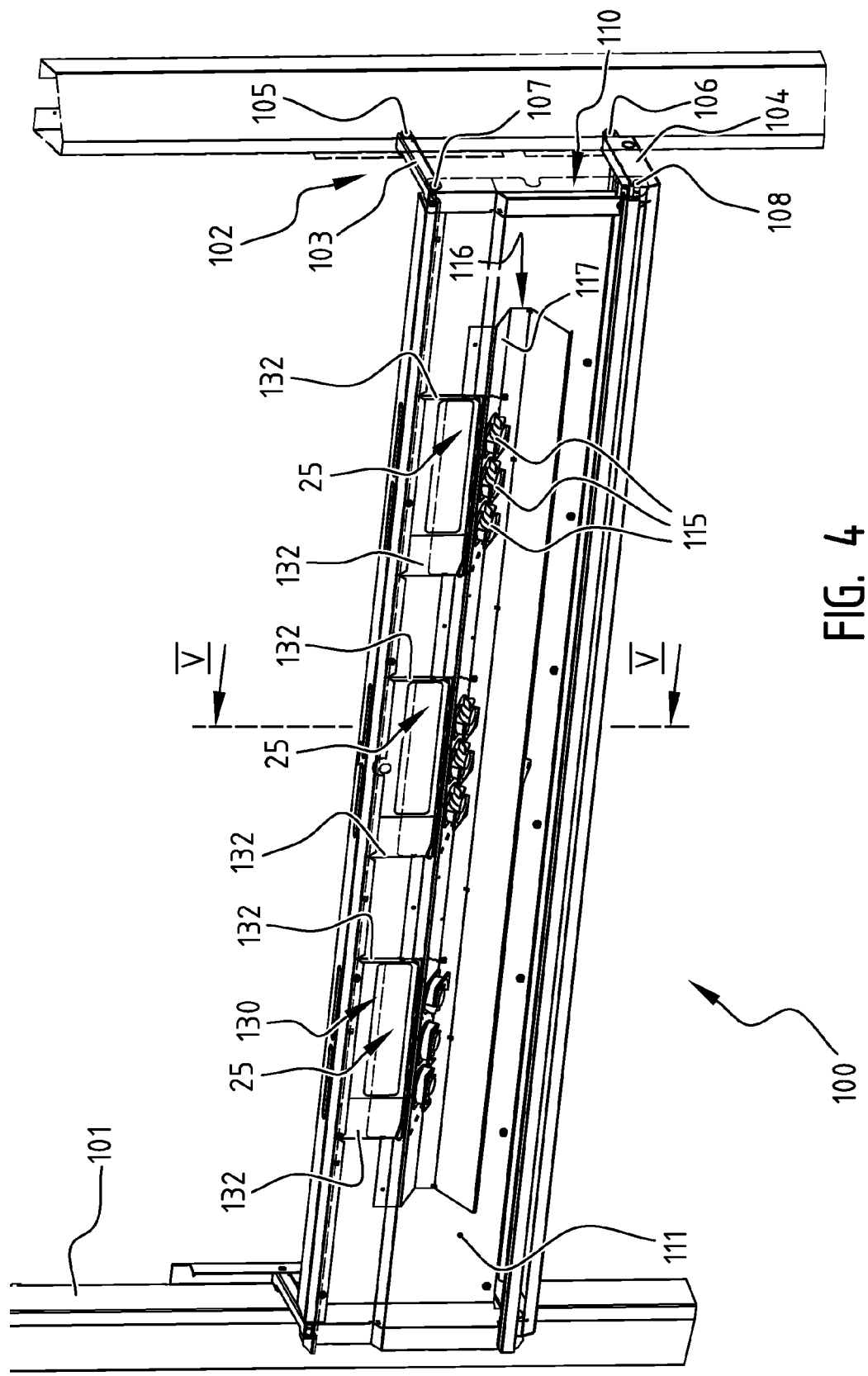
FIG. 4 shows a view of a partially opened door of an apparatus according to the invention.

FIG. 4 shows a door 100 and part of the housing 9 formed by a standing profile 101. Door 100 is shown in FIG. 1 in a closed position.

Door 100 is connected to the housing 9 in this embodiment by a parallelogram linkage mechanism on either side of the door. Mechanism 102 is shown on the right hand side.

The parallelogram linkage mechanism 102 comprises bars 103 and arm 104 connected to the housing 9 by two pivots 105,106. The bar 103 and arm 104 are also pivotally connected 107,108 to the door 100. The door 100 is mounted generally vertically to the housing and will remain in such an orientation also when the door is opened.

Arm 104 is part of a device functioning as a gutter to capture falling fluid. This shown in more detail in FIG. 5.

FIG. 4 shows a view onto the door 100 from the outside. Door 100 comprises an inside wall 110 shown with dotted lines and an outside wall 111. In between the double walled door, a system for reducing the blurring of the window 25 is received.

The blurring reduction system comprises a number of vents 115. The vents are mounted between the plates 110,111 of the door 100. In the shown embodiment the vents 115 are mounted to a profile 116 having a wing 117 extending upwardly in the inward direction.

Figure 5:
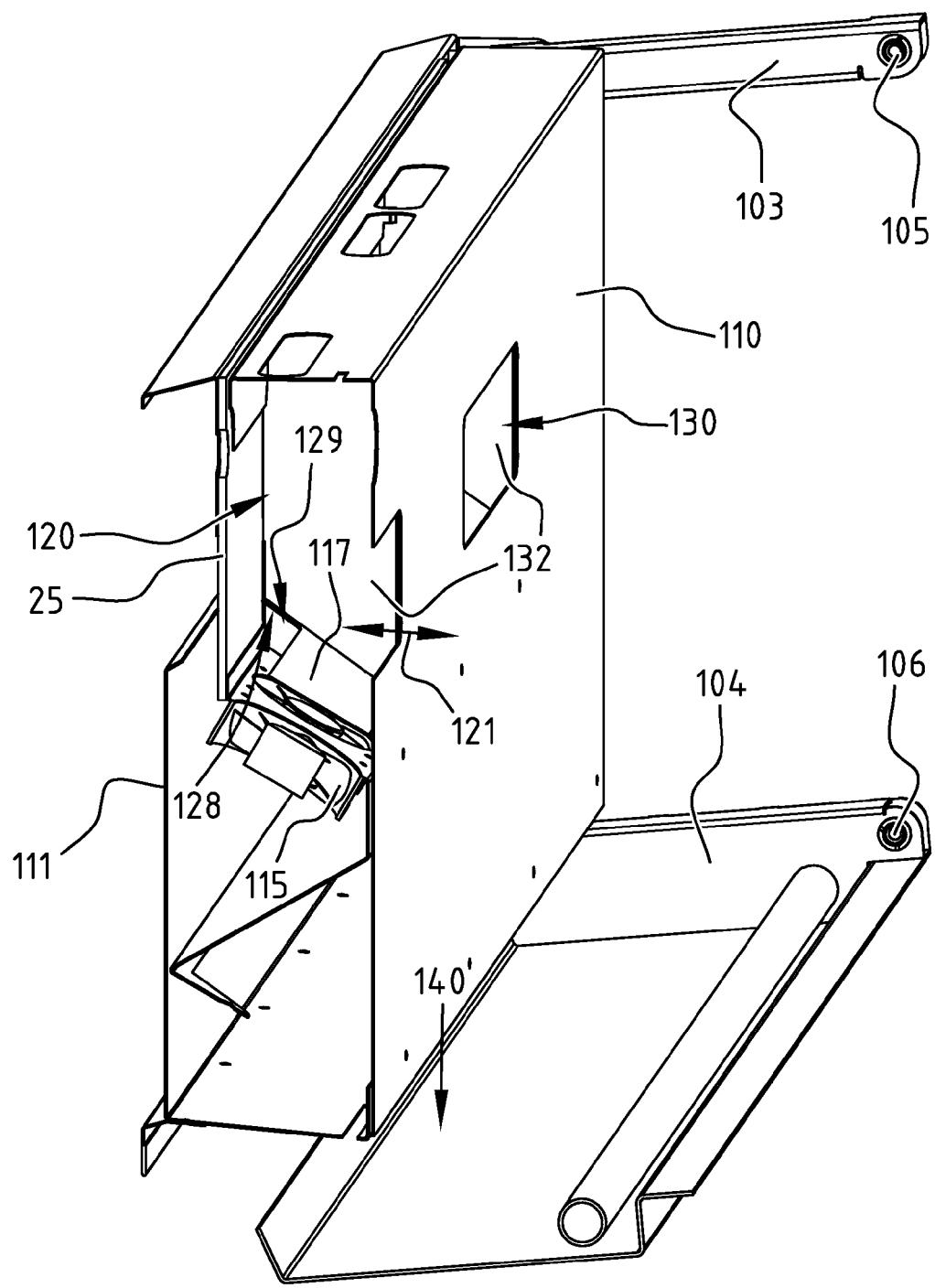
FIG. 5 shows a view close to cross section of the door according to FIG. 4.

Vents 115 can generate a flow of air 128 indicated in FIG. 5. Wing 117 has a number of slits 129. Each vent 115 can have one or more slits 129. The slits 129 are positioned in the wing 117 close to the window 25. The slits extend along the window 25.

The slit allows the flow of air generate by the vent 115 to reach the secondary chamber 120 on the inside of window 25. The air applied on and along the inside of the window 25 will reduce possible blurring by fluid such as steam on the inside on the window 25.

The vents 115 draw their air from outside. The outside wall 111 can have through-holes allowing the entrance of 'fresh' air from outside into the inner part of the door 100.

In a closed position as shown in FIG. 1, the door 100 closes the heat treatment chamber 64. Fluid can flow according to arrow 121 through rectangular passage 130 between secondary chamber 120 and heat treatment chamber 64. The passage 130 is an open passage. Heat fluid such as steam from the heat treatment chamber enters the secondary chamber 120 and can still cause some blurring on the inside of the windows. However such deposit is reduced due to the fluid flow 128.

The wing 117 forms a side of the secondary chamber 120. The inside of the window 25 and part of the outside wall 111 form another side of the secondary chamber 120. In this embodiment the top side of the chamber is also formed by door walls. Bulkheads 132 form side walls of the chamber 120. In an embodiment an exhaust (not shown) connects chamber 120 with the outside.

Fluid applied to the window is collected in the secondary chamber 120. The collected fluid, having low vapour content, will form an air curtain reducing the amount of heated fluid/steam from the heat treatment chamber 64 reaching the secondary chamber 120 and as a result reducing the deposit on window 25. The view into the heat treatment chamber will not be reduced or at least only limited.

Further the fluid flow device/vents 15 are arranged to provide fluid at an overpressure avoiding the steam from reaching the window.

As indicated in FIG. 2 the dominant fluid pattern in the heat treatment chamber 64 is upward near the sides of the housing. The fluid/air in secondary chamber 120 is of lower temperature. If air from the secondary chamber 120 enters the heat treatment chamber 64, it will further cool down the fluid flow. The fluid reaching vent 24 will be of lower temperature which is advantageous during heat shrinking.

As the human interface 62 comprising turning knobs and other means for (re-)configuring parameters of the steam in the heat treatment chamber is positioned close to, here above, the windows 25, the operator can view through the windows 25 into the heat treatment chamber, can adjust one or more parameters and can directly see the results of his actions through the windows. If necessary the parameters can be further adjusted. This method of operation, including the prevention of blurring the window 25, will result in more efficient operation of the apparatus 1 as a whole.

Extending along the inside wall 110 is a gutter 140 (shown in FIG. 5 only) formed by a profile. The gutter can collect vapour collected on the inside wall 110 and prevent the vapour from falling on the ground when the door is opened.

Although the invention is described referring to the drawing, it will be clear that the invention is not limited to the embodiments according to the drawings.

The invention claimed is:

1. An apparatus for heat shrinking a film wrapped around an object, the apparatus comprising:
   a housing having a heat treatment chamber configured to contain steam, the housing including a window arranged to allow an operator to look into an interior environment of the heat treatment chamber,
   a conveyor configured to support and move the object through the heat treatment chamber,
   at least one steam supply configured to supply steam to the heat treatment chamber,
   a steam outlet device including one or more outlets configured to output steam, the steam outlet device being connected to the at least one steam supply, the steam outlet device being disposed in the heat treatment chamber along the conveyor, and the one or more outlets being directed towards the moving object, and
   a blurring reduction system including:
      an air flow generator configured to generate an unheated air flow directed along and at an interior side of the window,
      an air inlet configured to receive an intake of the air flow from outside the heat treatment chamber,
      a secondary chamber arranged in between the window and the heat treatment chamber, the secondary chamber being connected to the heat treatment chamber by a passage, and
      the window, the passage of the secondary chamber, and the steam outlet device being aligned to allow an operator to view the steam outlet device in the heat treatment chamber through the window and the passage of the secondary chamber.

2. The apparatus according to claim 1, further comprising:
   a configuration device disposed on the outside of the housing adjacent the window, the configuration device being connected to the steam outlet device and being configured to control a distance, direction and pressure of the supplied steam.

3. The apparatus according to claim 2, wherein the configuration device includes:
   turning knobs provided on an outside environment of the housing adjacent to the window.

4. The apparatus according to claim 1, wherein the air flow generator includes:
   at least one fluid flow vent configured to guide the airflow from an exterior environment to an interior environment of the apparatus, and
   the at least one fluid flow vent includes a fan.

5. The apparatus according to claim 1, wherein the housing includes:
   a door having the window and the blurring reduction system.

6. The apparatus according to claim 5, wherein the door is a generally vertically positioned door connected to the housing by a parallelogram linkage mechanism.

7. The apparatus according to claim 5, wherein the door is a double walled door and the at least one fluid flow vent is disposed between the double walls of the door.

8. A method of operating an apparatus for shrinking a heat shrinkable film wrapped around an object, the apparatus having a window for viewing inside a heat treatment chamber, the method comprising:
   transporting the upright standing object wrapped with heat shrinkable film through the heat treatment chamber;
   applying steam onto a side of the film, and
   directing unheated air from outside the heat treatment chamber at and onto an interior side of the window, wherein:
   the apparatus includes a secondary chamber that is separate from the heat treatment chamber, the secondary chamber and the heat treatment chamber being connected by a passage, and
   the window, the passage of the secondary chamber, and the steam outlet device being aligned to allow an operator to view the steam outlet device in the heat treatment chamber through the window and the passage of the secondary chamber.

9. The method according to claim 8, further comprising:
   controlling a distance, direction and pressure of the supplied steam by an operator.

10. The apparatus according to claim 1, wherein the air inlet is disposed on a periphery of the window.

11. The method according to claim 8, wherein the unheated air is supplied though an air inlet disposed on a periphery of the window.

\* \* \* \* \*